United States Patent [19]

Podrazhansky et al.

[11] Patent Number: 4,829,225
[45] Date of Patent: May 9, 1989

[54] RAPID BATTERY CHARGER, DISCHARGER AND CONDITIONER

[75] Inventors: Yury Podrazhansky, Norcross; Phillip W. Popp, Doraville, both of Ga.

[73] Assignee: Electronic Power Devices, Corp., Norcross, Ga.

[21] Appl. No.: 790,461

[22] Filed: Oct. 23, 1985

[51] Int. Cl.$^4$ .................... H02J 7/04; H01M 10/44
[52] U.S. Cl. ............................. 320/14; 320/20; 320/21
[58] Field of Search ............... 320/13, 14, 20, 21, 320/2

[56] References Cited

U.S. PATENT DOCUMENTS

| | | | |
|---|---|---|---|
| 3,597,673 | 8/1971 | Burkett et al. | 320/14 X |
| 3,614,583 | 10/1971 | Burkett et al. | 320/14 X |
| 3,617,851 | 11/1971 | DuPuy et al. | 320/14 X |
| 4,016,473 | 4/1977 | Newman | 320/14 |
| 4,302,714 | 11/1981 | Yefsky | 320/14 X |
| 4,654,574 | 3/1987 | Thaler | 320/14 |
| 4,746,852 | 5/1988 | Martin | 320/14 X |

FOREIGN PATENT DOCUMENTS 0445089 3/1975 U.S.S.R. .................... 320/13

*Primary Examiner*—R. J. Hickey
*Attorney, Agent, or Firm*—Needle & Rosenberg

[57] ABSTRACT

An improved method and device for rapidly charging a battery by providing a charge pulse to the battery, followed immediately by a depolarization pulse created by allowing the battery to discharge across a load, followed by a stabilization period, and repeating this sequence cyclically until the battery is charged is disclosed. Preferably, the current level of the charge pulse is equal to or greater than the nominal rated current at which the battery can discharge in an hour, in order to achieve rapid charging. The duration of the charge pulse will generally be about one-tenth to two seconds. The current level of the depolarization pulse may be approximately the same magnitude or greater than the charging current, but of significantly shorter duration, such as 0.2-5% of the duration, to avoid unnecessary discharging of the battery. The duration of the stabilization period is generally greater than the magnitude of the depolarizing pulse. By optimizing these time and current characteristics of the charge, depolarization and stabilization periods for any particular type of battery, the battery may be charged most rapidly while prolonging the life of the battery. These characteristics may also be varied as the battery is charged based on the charge of the battery measured under load.

12 Claims, 4 Drawing Sheets

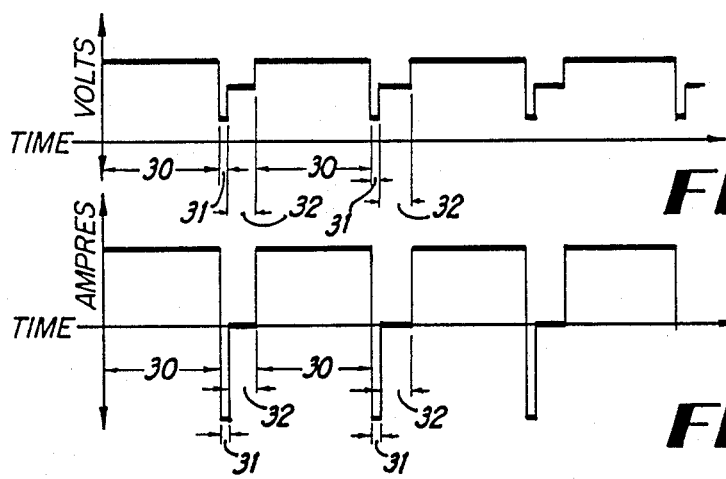
FIG 2A
FIG 2B
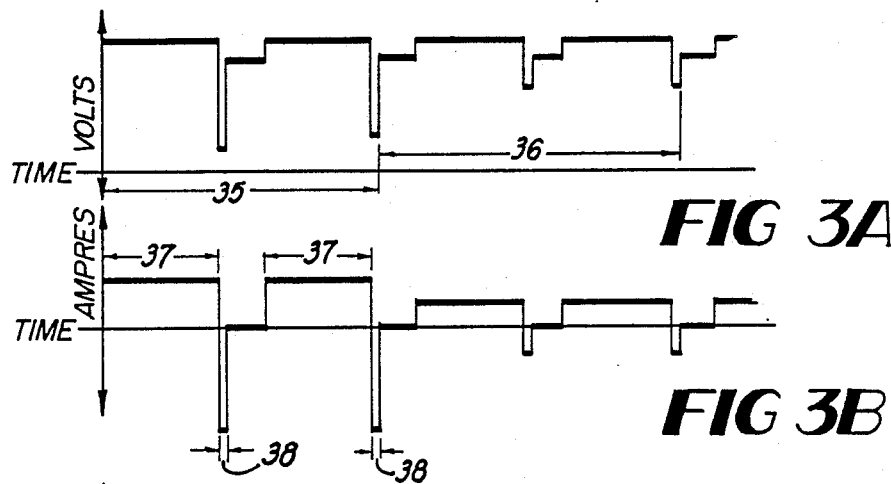
FIG 3A
FIG 3B
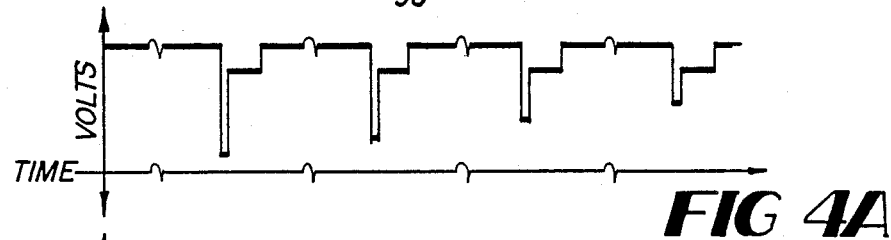
FIG 4A
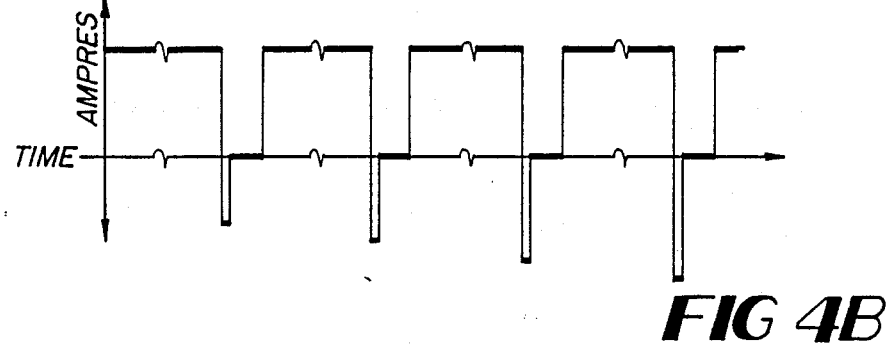
FIG 4B

RAPID BATTERY CHARGER, DISCHARGER AND CONDITIONER

BACKGROUND OF THE INVENTION

This invention relates to methods and devices for charging, discharging and reconditioning batteries. More particularly, a novel method is disclosed for the rapid charging of batteries, the rapid discharging of batteries, and rapid reconditioning of batteries.

It is known in the art to charge a battery rapidly by applying a charging current with discharging intervals interspersed between the charging intervals. For instance, U.S. Pat. No. 3,609,503 to Burkett et al., describes the use of such depolarization of a battery by discharging it, which will allow a much larger charging current to be applied to the battery, thereby allowing a faster charge of the battery. In another U.S. Pat. No. 3,597,673, also issued to Burkett et al., such a rapid charge system is disclosed wherein the discharge path is applied during time between charge pulses. Since, in this implementation, the length and spacing of charge pulses is determined based on the frequency of the alternating power source and the charge of the battery, and since for rapid charging the discharge pulse must be relatively short, the disclosure points out that there may be a rest period before or after the discharge pulse. Furthermore, the duration of the discharge pulse may vary during the process of charging the battery. The rest period thus resulting is an incidental effect of the particular charging pulse generator method, and it was not recognized or claimed that an appropriate rest period may itself have beneficial results.

Furthermore, it is recognized that batteries have "memories" in that after a number of charges the ability of a battery to take on a satisfactory charge is inhibited. In such cases it is known to recondition a battery by repeatedly discharging the battery and recharging the battery. However, even with known rapid charging systems, such reconditioning is very slow due to the necessary discharge time with available discharge devices.

SUMMARY OF THE INVENTION

When a charging current is applied to a battery, positive ions move to the negative plate and negative ions move to the positive plate. A portion of the ions will give their charge to the battery but will tend to block further ions from reaching the plates and transferring their charge. Thus, a depolarizing pulse serves to pull the ions away from the plate, so that charged ions may again transfer charge to the plate on the next charge pulse. In order for the battery to accept high current without overheating, it is necessary to force the ions away from the plate, but not too far away or to the opposite plate. The ions need time to stabilize in becoming separated from the plate and finding their position between the plates. Therefore, a stabilization period is desirable after each depolarizing pulse during rapid charging to reduce the lost energy required to force ions to the plate when the charging pulse arrives.

The present invention includes an improved method and device for rapidly charging a battery by providing a charge pulse to the battery, followed immediately by a depolarization pulse created by allowing the battery to discharge across a load, followed by a stabilization period, and repeating this sequence cyclically until the battery is charged. Preferably, the current level of the charge pulse is equal to or greater than the nominal rated current at which the battery can discharge in an hour, in order to achieve rapid charging. The duration of the charge pulse will generally be about one-tenth to two seconds. The current level of the depolarization pulse may be approximately the same magnitude or greater than the charging current, but of significantly shorter duration, such as 0.2-5% of the duration, to avoid unnecessary discharging of the battery. The duration of the stabilization period is generally greater than the magnitude of the depolarization pulse. By optimizing these time and current characteristics of the charge, depolarization and stabilization periods for any particular type of battery, the battery may be charged most rapidly while prolonging the life of the battery. These characteristics may also be varied as the battery is charged based on the charge of the battery measured under load.

The present invention also includes a method and device for rapid discharging of a battery by allowing the battery to discharge across a load and periodically interrupting the discharging in order to apply a depolarizing pulse by applying a positive charge to the battery. Preferably, a stabilization period will follow the depolarizing pulse before the battery is again discharged. By discharging the battery in this manner, the resistance of the load may be such that the discharge current level is equal to or greater than the nominal rated current, while the depolarizing pulse allows the rapid discharge without damage to the battery. The time and current levels of the discharge across a load, the depolarization and the stabilization period may optimized for the battery to be discharged, and these values may be varied as the battery becomes discharged to a predetermined level.

Furthermore, the present invention includes a method and device for reconditioning a battery which no longer may be charged to full capacity. The reconditioning method involves rapid discharging of the battery followed by rapid charging of the battery, and repeating this cycle of discharging and charging a number of times until the capacity of the battery is restored to the desired capacity. Typically, reconditioning is accomplished in three cycles. Preferably, the rapid charging and discharging will be accomplished by the methods described herein. Such reconditioning will enable a battery to be rapidly returned to a condition where its capacity approaches the state of a new battery.

Therefore, it is an object of this invention to provide an improved method of and device for rapid charging that will avoid damage to or deterioration of the battery being charged.

It is a further object of this invention to provide a method and device for rapid discharging of a battery without causing damage to or deterioration of the battery.

It is yet a further object of this invention to provide a method of and device for rapid reconditining of batteries.

These and other objects and advantages will appear from the following description with reference to the drawings.

DESCRIPTION OF THE DRAWINGS

FIG. 2a is a representative voltage-time graph during a short time segment of the voltage across a battery being charged by the rapid charging device of the present invention.

FIG. 2b is a representative current-time graph associated with FIG. 2a.

FIGS. 3a and 3b are voltage-time and current-time graphs, respectively, at various times during charging of a battery by the present invention.

FIGS. 4a and 4b are another pair of voltage-time and current-time graphs at various times during the charging of a battery by the present invention.

DESCRIPTION OF THE PREFERRED EMBODIMENTS

The preferred embodiments of the present invention are now described with reference to the drawings.

Figure 1:
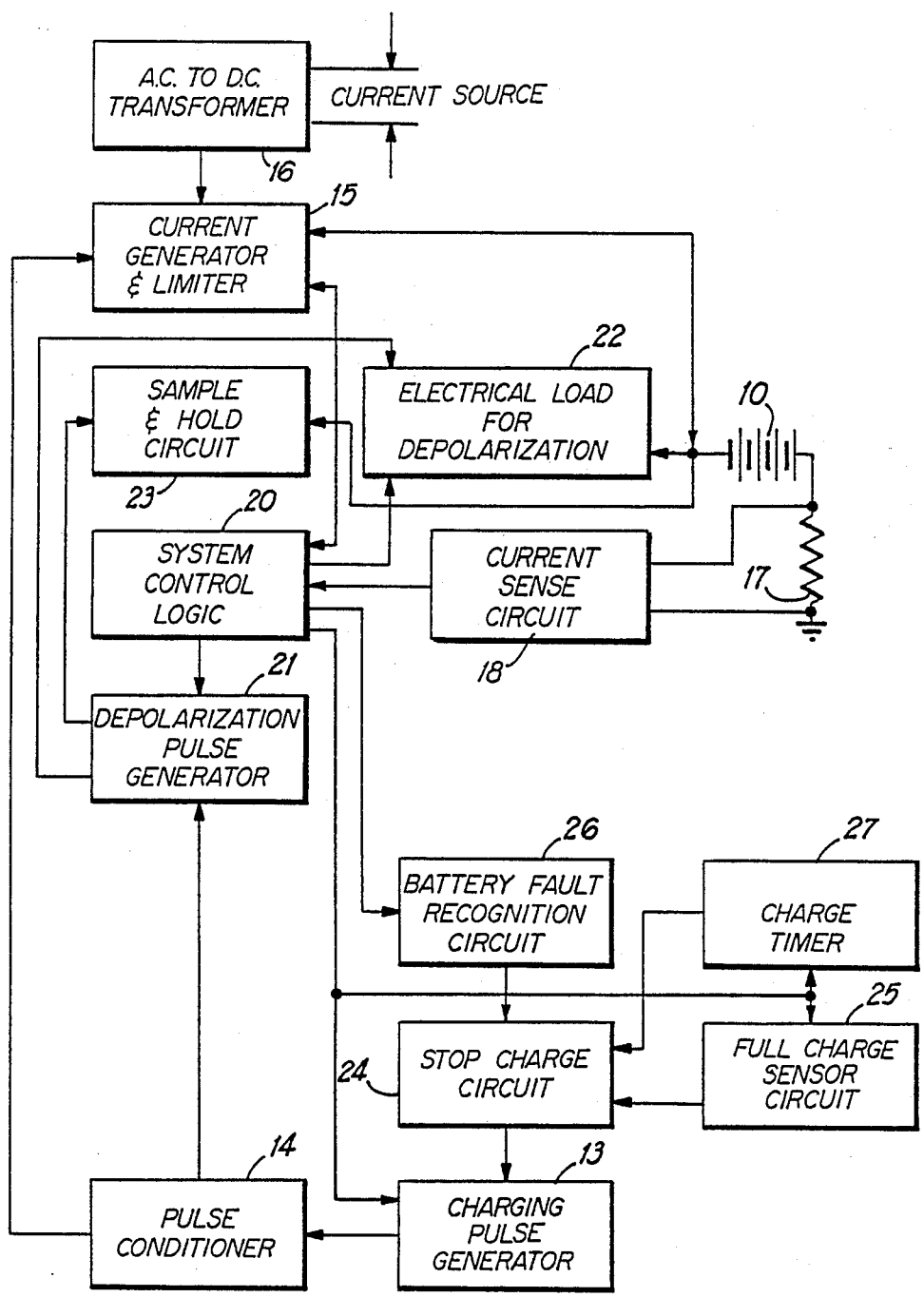
FIG. 1 is a block diagram of a rapid charging device of the present invention.

FIG. 1 is a functional block diagram of an embodiment of the rapid-charging device for charging a battery. When a battery 10 is connected to the rapid charger, the battery current sense circuit 18 senses a current across the resistor 17 and sends a signal to the system control logic 20 which enables charge pulses to be generated. Pulse generator 13 generates charge timing pulses which define the timing of the beginning and the end of each charge pulse. The duration of the pulses may be controlled by system control logic 20. Pulse conditioner 14 removes transients and insures a clean signal. When the signal for pulse conditioner 14 is high, the current generator and limiter 15 allows DC current from power supply 16 to pass through to battery 10 and resistor 17. Resistor 17 preferably has low resistance, so that most of the charge is given to the battery. The current sense circuit 18 calculates the current by measuring the voltage across known resistance 17, and inputs the value of the charging current back to the system control logic 20. The charge current is controlled by the current generator and limiter is based on signals from the system control logic 20.

When each charge pulse ends, the event will be sensed by the depolarization pulse generator 21, which will generate a pulse to time the length of the battery discharge. The pulse from the depolarization pulse generator 21 to the electrical load 22 will enable an electrical load 22 to be placed across the battery 10 to discharge it. This discharge load may be provided by a transistor which can be controlled by the system control logic 20 to provide a variable resistance. Thus, the load may be controlled by the system control logic 20, based on feedback from current sense circuit 18 to provide either a constant discharge current throughout the process, or a current which varies based on the charge of the battery. During each depolarization pulse, the voltage of the battery under the load is sampled by sample and hold circuit 23 which senses the signal from the depolarization pulse generator 21, and held when the depolarization pulse ends. The sample voltage under load from the sample and hold circuit 23 is input to the system control logic 20 as the main determinant of the progress of the charging process. The system control logic is preferably a microprocessor programmed to control the charging process. Information may be input into the system control logic 20 by the user to define the type of battery to be charged and the parameters of the charging process to be carried out for the battery.

The stabilization period is the period of time between the end of the depolarization pulse and the start of the next charging pulse where the battery is neither charged nor discharged. The length of the depolarization pulse is controlled by the system control logic 20. FIGS. 2a and 2b show the voltage and current characteristics during the charge periods 30, depolarization periods 31, and stabilization periods 32.

FIG. 1 also includes means for terminating the charging of the battery through the stop charge circuit 24 which disables the charge pulse generator 13. The stop charge circuit 24 may be signaled when a full charge for the battery being charged is sensed by the full charge circuit 25 based on signals from the system control logic 20, but charging may also be terminated by the stop charge circuit 24 if the charge after a minimum time is such that the faulty battery recognition circuit 26 determines that the battery is bad or if the battery does not charge fully within maximum alloted time determined by timer 27 from a time initiated by the system control logic.

Furthermore, the charger may remain attached to the battery once the battery is fully charged in order to maintain the battery at full charge. For this mode, the charger would be programmed to periodically take a charge reading under load. If the logic determines that the charge has fallen below the maintenance level, the charging mode may be reinitiated.

FIGS. 3a and 3b illustrate the characteristics of the charge and current under a two stage charging sequence. The charging is initiated with a relatively high current for both the charge pulse 37 and depolarization pulse 38 during the period 35 until the battery reaches a nearly fully charged condition determined by a cut-back voltage level. At this threshold level, the current of the charge pulse 39 and the depolarization pulse 40 are changed to cut-back levels from the period 36 until the battery is fully charged. Note that in this embodiment, while the current level of the charge and depolarization pulses are changed, the duration of the charge and depolarization pulses, as well as the period for stabilization, remain constant.

FIGS. 4a and 4b illustrate a different charging method wherein the charge pulse current remains constant at a rapid charging level throughout the process, and the depolarization current increases as the battery becomes charged. This increase may result due to an increasingly higher charge across a constant discharge load during depolarization, or the discharge load may also be adjusted to control the depolarization current. This charging method is desirable because if a high charging current remains as the battery becomes fully charged, a larger depolarization is required than during the time when the battery is in a relatively discharged condition.

To illustrate typical parameters of the charging method of this invention, the following are examples for different battery times of initial charger characteristics which are suitable:

EXAMPLE 1

9 VOLT ALKALINE BATTERY
Charging Pulse: 0.5 amps
Charging Pulse Period: 550 milliseconds (msec.)
Depolarization current: 6 amps
Depolarization Period: 2-3 msec.
Stabilization Period: 15-20 msec.
Total Time to charge from 50% to 100% capacity: 12-15 minutes.

EXAMPLE 2

1.25 VOLT NICKEL-CADMIUM BATTERY
(500 milliamp/hour rating)
Charging Pulse: 1.2 amps
Charging Period: 700 msec.
Depolarization Current: 6 amps
Depolarization Period: 2 msec.
Stabilization Period: 7-10 msec.
Total Time to Charge from 20% to 100% capacity: 20 minutes.

EXAMPLE 3

15 VOLT NICKEL-CADMIUM BATTERY
(2 amp/hour rating)
Charging Pulse: 3.0 amp
Charging Period: 500 msec.
Depolarization Current: 14 amps
Depolarization Period: 2 msec.
Stabilization Period: 10 msec.
Total time to charge from 20% up to 100% capacity: 35-40 minutes.

EXAMPLE 4

12 VOLT AUTOMOBILE BATTERY
(40 amp/hour rating)
Charging Pulse: 48 amps
Charging Period: 850 msec.
Depolarization Current: 85 amps
Depolarization Period: 3 msec.
Stabilization Period: 15 msec.
Total time to charge from 20% to 100% capacity: 40 minutes.

The magnitude of the charging and depolarizing pulses are generally about one to four times the current rating period hour discharge of the battery, with the duration of the charging pulse being between one-tenth and one second, and the duration of both the depolarizing pulse and the rest period being between 0.2 to 5 percent of the charging duration.

Figure 5:
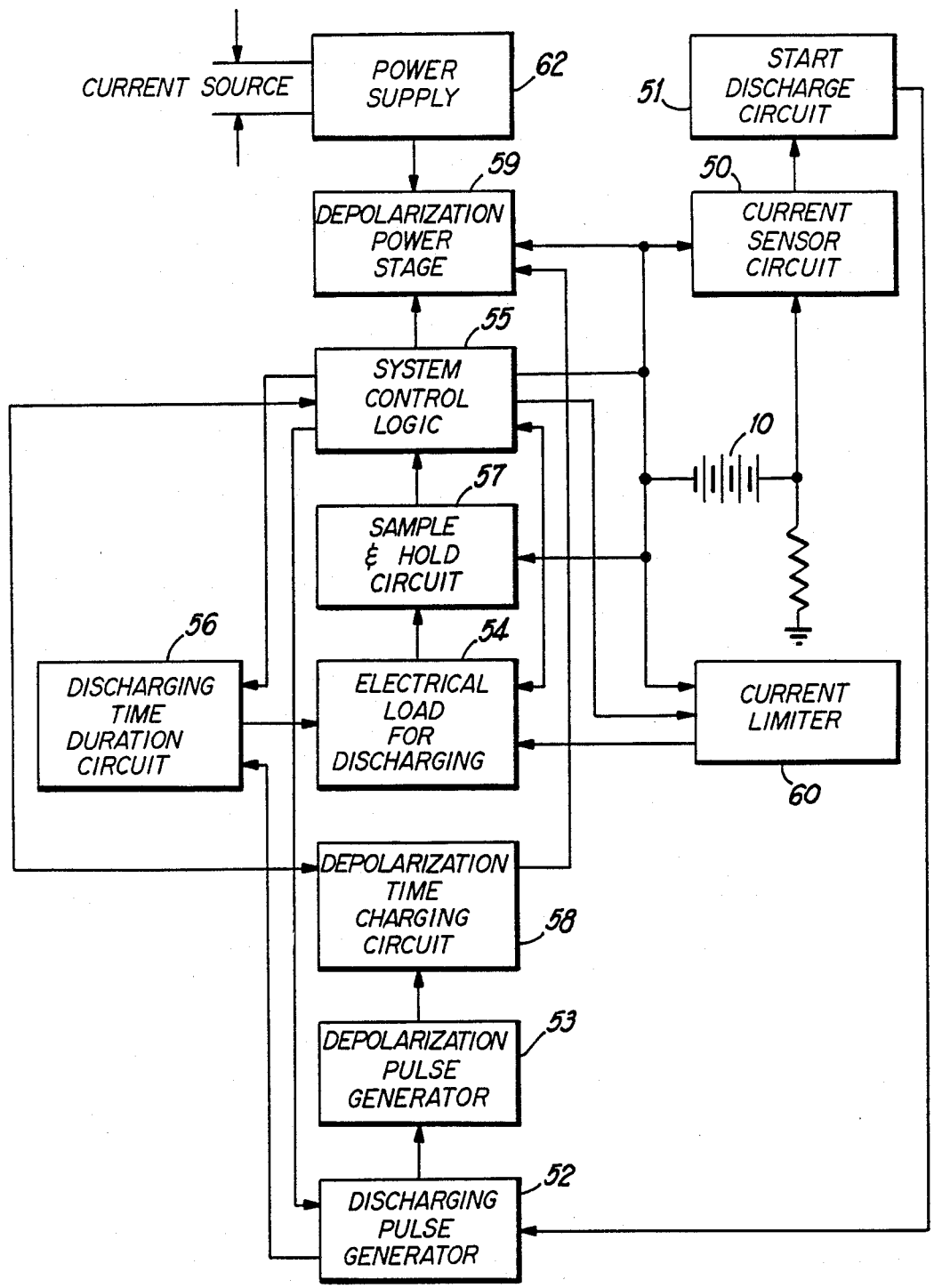
FIG. 5 is a block diagram of a rapid discharging device of the present invention.

FIG. 5 is a functional block diagram of a rapid discharger. The battery 10 to be discharged is connected to the discharger, and its presence is sensed by current sense circuit 50, which permits the start discharge circuit 51 to enable the discharge timing signal generator 52. The discharge timing signal generator defines the timing for the system since the beginning of each discharge timing signal initiates the discharge of the battery and the end of the timing signal initiates the depolarization pulse by triggering the depolarization pulse generator 53.

The beginning of each discharge timing signal causes electrical load circuit 54 to put an electrical load across the battery 10. The system control logic 55 controls the resistance of the electrical load and therefore the discharge current from the battery. The duration of discharging may also be made less than the discharge timing signal by means of the time duration circuit 56 which is also controlled by the system control logic 55. If the time duration circuit shortens the duration of discharge, a stabilization period will necessarily occur between the discharge pulse and the following depolarization pulse.

The system control logic bases its control decisions on inputs from the sample and hold circuit 57 which takes a reading of each cycle charge of the battery under load or alternatively, the charge of the battery during the stabilization period.

The depolarization of the battery in the rapid discharger is accomplished by a relatively short pulse of positive charge. The depolarization pulse is initiated by the depolarization pulse generator 53 and its duration is determined in the depolarization time duration circuit 58 as instructed by the system control logic 55. A pulse of the desired duration is thereby directed to the depolarization power stage 59. Direct current power is obtained from power supply 62 and the magnitude of the depolarization current is controlled by the current limiter 60. The voltage level of the battery is compared with the full discharge voltage value for the battery being discharged in the system control logic 55, which disables the discharging pulse generator 52 when the battery is fully discharged.

Figure 6A:
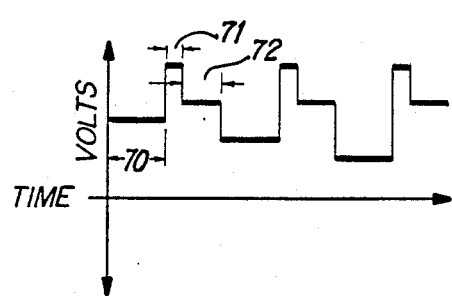
FIGS. 6a and 6b are a pair of voltage-time and current-time graphs at various times during the discharging of a battery by the present invention.
Figure 6B:
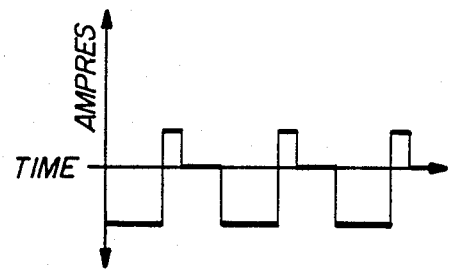

FIGS. 6a and 6b illustrate the characteristics of the charge and current of a battery being discharged by the rapid discharger. The discharge period 70 is relatively long, generally between one-tenth and two seconds. It is followed by a depolarizing pulse 71 whose duration is much shorter, preferably about two-tenths to five percent of the discharging period 70, and the stabilization period 72 follows the depolarizing pulse and its duration is also about one to five percent of the discharging period. The magnitude of the current for both discharging and depolarization are similar to the ranges discussed above for the charging device.

Figure 7A:
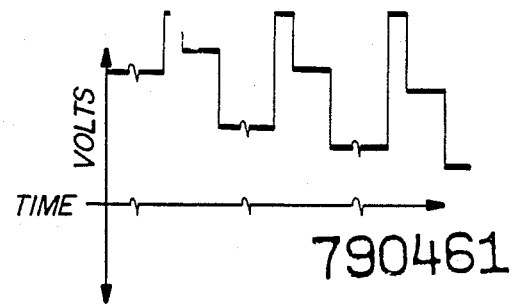
FIGS. 7a and 7b are another pair of voltage-time and current-time graphs at various times during the discharging of a battery by the present invention.
Figure 7B:
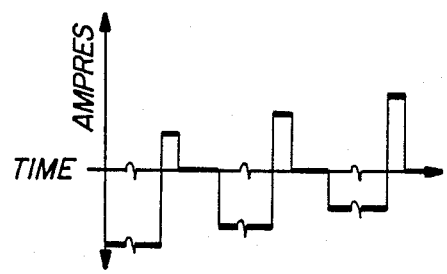

FIGS. 7a and 7b illustrates the characteristics of the voltage and current of a battery being discharged where both the duration of the discharging period and the magnitude of the discharging current vary as the battery is discharged. The depolarizing pulse is also varied over time.

Depending on the particular battery type, an optimum discharging cycle may be chosen wherein the values of the duration and magnitude of the discharge, depolarization and stabilization phases may be chosen to be fixed values or may be varied, either stepwise at particular battery charge threshholds or dynamically as the battery is discharged. Furthermore, a stabilization period may occur both before and after the depolarizing pulse or not at all.

Figure 8:
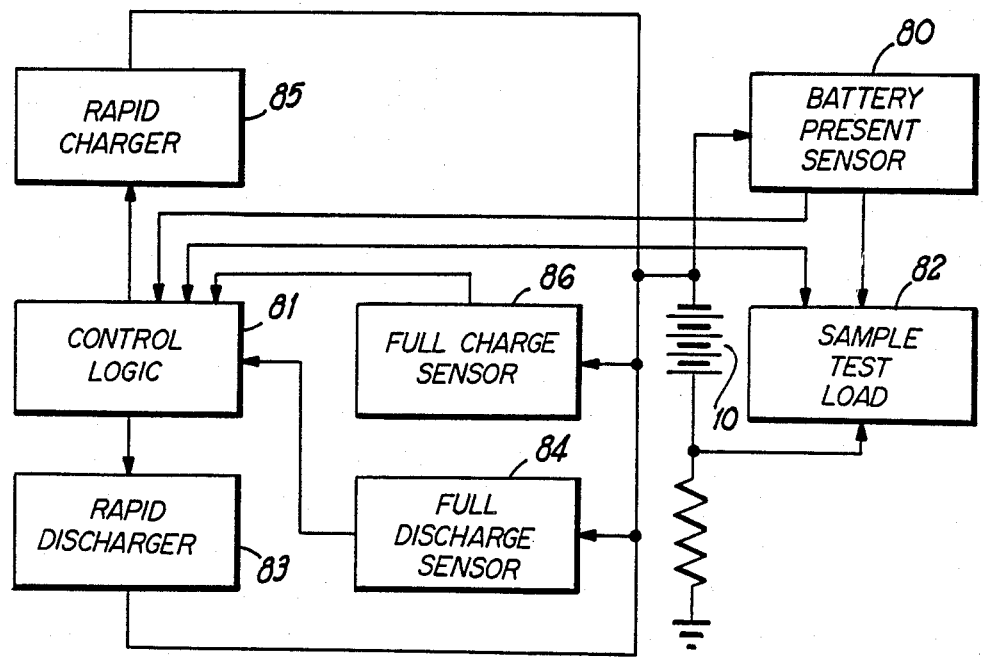
FIG. 8 is a block diagram of a reconditioning device of the present invention.

FIG. 8 is a functional block diagram of a battery reconditioning device. when the battery present sensor 80 senses the battery 10 attached, it signals the control logic 81 which first examines the condition of the battery charge by sample test load 82, and determines whether the battery needs first to be charged or discharged. For discharging the battery, the logic control circuit initiates rapid discharger 83 to discharge the battery in accordance with the discharger of this invention previously described. When the full discharge sensor 84 determines that the battery is fully discharged, the logic control circuit 81 terminates the discharging and initiates the rapid charger 85 to charge the battery until the full charge sensor 86 determines that the battery has reached full charge. This cycle of discharging and charging is repeated until the battery is reconditioned. Normally, these cycles are sufficient to recondition the battery.

While the invention has been described in detail with particular reference to the preferred embodiments thereof, it will be understood that variations and modifications can be affected within the spirit and scope of the invention as previously described and defined in the claims.

What is claimed is:

1. A method of rapidly charging a battery which comprises the steps of:
    applying to the battery an electrical charging pulse;
    depolarizing the battery by applying a load across the battery immediately after said charging pulse step;
    allowing a stabilization period of a predetermined duration after the depolarization step and prior to the next charging pulse step; and
    measuring the change of the battery during said depolarizing step;
    wherein said sequence of steps is cyclically repeated until the desired level of charge is achieved.

2. The method of claim 1, which further comprises the steps of varying the current of the charge pulse in the charging step and changing the load in the depolarization step when the measured charge reaches a predetermined level.

3. The method of claim 2, wherein the current of the charge pulse is reduced and the load in the depolarization step is increased when the measured charge reaches a predetermined level.

4. The method of claim 3, where said predetermined level is a level of charge such that the battery is near full charge.

5. A method of rapidly charging a battery which comprises the steps of:
    applying to the battery an electrical charging pulse;
    depolarizing the battery by applying a load across the battery immediately after said charging pulse step; and
    allowing a stabilization period of a predetermined duration after the depolarization step and prior to the next charging pulse step;
    wherein said sequence of steps is cyclically repeated until the desired level of charge is achieved, and wherein the current level of the charge pulse and the load of said depolarization step are varied as the battery is charged.

6. The method of claim 5, wherein the charge current and the depolarization current are reduced as the battery is charged.

7. A method of rapidly charging a battery which comprises the steps of:
    applying to the battery an electrical charging pulse;
    depolarizing the battery by applying a load across the battery immediately after said charging pulse step; and
    allowing a stabilization period of a predetermined duration after the depolarization step and prior to the next charging pulse step;
    wherein said sequence of steps is cyclically repeated until the desired level of charging is achieved; and wherein the current level of the charge pulse remains constant as the battery is charged and the depolarization load is changed such that the depolarization current is varied as the battery is charged.

8. The method of claim 7, wherein the depolarization load is decreased such that the depolarization current is increased as the battery is charged.

9. A device for rapidly reconditioning a battery, which comprises:
    means for applying a positively charged electrical pulse to the battery;
    means for applying a load across the battery;
    means for measuring the charge of the battery when said load is applied to the battery; and
    control means for controlling said positively charged electrical pulse applying means and said load applying means such that the battery may be rapidly discharged by periodically applying a depolarizing positively charged electrical pulse to the battery during discharge and rapidly charged by periodically applying a depolarizing load across the battery during charging, and based on input from said charge measuring means, determining when to alternate between charging and discharging the battery.

10. The device of claim 9, wherein, when charging the battery, said control means operates to apply a load immediately after it applies said positively charged electrical pulse to the battery, then allows a stabilization period of a predetermined duration to occur before applying the next positively charge electrical pulse, and cyclically repeats the sequence.

11. The device of claim 9, wherein, when discharging the battery, said control means alternates the application of said load applying means and said means for applying a positively charged electrical pulse.

12. The device of claim 10, wherein, when discharging the battery, said control means alternates the application of said load applying means and said means for applying a positively charged electrical pulse.

* * * * *